(12) United States Patent
Farmer

(10) Patent No.: US 7,116,800 B2
(45) Date of Patent: Oct. 3, 2006

(54) IMAGE SEGMENTATION SYSTEM AND METHOD

(75) Inventor: Michael Edward Farmer, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 764 days.

(21) Appl. No.: 10/023,787

(22) Filed: Dec. 17, 2001

(65) Prior Publication Data
US 2003/0031345 A1    Feb. 13, 2003

Related U.S. Application Data

(63) Continuation-in-part of application No. 09/870,151, filed on May 30, 2001, now Pat. No. 6,459,974, and a continuation-in-part of application No. 10/006,564, filed on Nov. 5, 2001, now Pat. No. 6,577,936, and a continuation-in-part of application No. 09/901,805, filed on Jul. 10, 2001.

(51) Int. Cl.
G06K 9/00 (2006.01)

(52) U.S. Cl. ............... 382/103; 382/171; 382/172; 382/173; 382/257; 358/464

(58) Field of Classification Search ............... 382/103, 382/270, 171–173, 164, 257, 154, 207; 358/464–466, 358/538; 348/169
See application file for complete search history.

(56) References Cited

U.S. PATENT DOCUMENTS

| | | | |
|---|---|---|---|
| 4,179,696 A | 12/1979 | Quesinberry et al. | 343/7.4 |
| 4,625,329 A * | 11/1986 | Ishikawa et al. | 382/104 |
| 4,985,835 A | 1/1991 | Sterler et al. | 364/424 |
| 5,051,751 A | 9/1991 | Gray | 342/107 |
| 5,074,583 A | 12/1991 | Fujita et al. | |
| 5,229,943 A | 7/1993 | Eigler et al. | 364/424 |
| 5,256,904 A | 10/1993 | Tohbaru | 307/10.1 |

(Continued)

FOREIGN PATENT DOCUMENTS

GB    2236419 A    4/1991

(Continued)

OTHER PUBLICATIONS

Baxes; Book Publication, 1994; "Digital Image Processing: principles and applications". (pp. 62-64; 73-77; 123-155; 330-334).*

(Continued)

Primary Examiner—Bhavesh M. Mehta
Assistant Examiner—Manav Seth
(74) Attorney, Agent, or Firm—Rader, Fishman & Grauer PLLC

(57) ABSTRACT

The present invention relates in general to systems used to process images. In particular, the present invention is an image segmentation system and method used to isolate the segmented image of a target person, animal, or object from an ambient image which includes the target person, animal, or object, in addition to the area surrounding the target. The invention supports the ability of an airbag deployment system to distinguish between different types of occupants by providing such deployment systems with a segmented image of the occupant. The invention is particularly useful at night or in other environments involving inadequate light or undesirable shadows. The invention can use histograms and cumulative distribution functions to perform image thresholding. Morphological erosion and dilation can be used to eliminate optical "noise" from the image. Gap filling is performed on the basis of the "momentum" and "gravity" of regions of similar pixel values. An upper ellipse can generated to represent the upper torso of the occupant. The invention is highly flexible, and can be modified in accordance with the desired use.

43 Claims, 7 Drawing Sheets

U.S. PATENT DOCUMENTS

| | | | |
|---|---|---|---|
| 5,366,241 A | 11/1994 | Kithil | |
| 5,398,185 A | 3/1995 | Omura | |
| 5,413,378 A | 5/1995 | Steffens, Jr. et al. | |
| 5,446,661 A | 8/1995 | Gioutsos et al. | |
| 5,490,069 A | 2/1996 | Gioutsos et al. | |
| 5,528,698 A * | 6/1996 | Kamei et al. | 382/100 |
| 5,715,006 A * | 2/1998 | Yokoyama | 348/416.1 |
| 5,832,111 A * | 11/1998 | Florent | 382/171 |
| 5,890,085 A | 3/1999 | Corrado et al. | 701/47 |
| 5,917,936 A * | 6/1999 | Katto | 382/154 |
| 5,923,776 A * | 7/1999 | Kamgar-Parsi | 382/173 |
| 5,982,944 A * | 11/1999 | Vaidyanathan et al. | 382/271 |
| 5,983,147 A | 11/1999 | Krumm | |
| 6,005,958 A | 12/1999 | Farmer et al. | |
| 6,018,693 A | 1/2000 | Blackburn et al. | 701/45 |
| 6,026,340 A | 2/2000 | Corrado et al. | 701/47 |
| 6,116,640 A | 9/2000 | Tanaka et al. | |
| 6,198,998 B1 | 3/2001 | Farmer et al. | |
| 6,249,590 B1 * | 6/2001 | Young et al. | 382/103 |
| 6,272,411 B1 | 8/2001 | Corrado et al. | 701/45 |
| 6,459,974 B1 | 10/2002 | Baloch et al. | |
| 6,577,936 B1 | 6/2003 | Farmer | |
| 6,625,310 B1 * | 9/2003 | Lipton et al. | 382/173 |
| 6,662,093 B1 | 12/2003 | Farmer | |
| 6,697,502 B1 * | 2/2004 | Luo | 382/115 |
| 6,801,662 B1 * | 10/2004 | Owechko et al. | 382/224 |
| 2003/0016845 A1 | 1/2003 | Farmer | |
| 2003/0123704 A1 | 7/2003 | Farmer et al. | |
| 2003/0133595 A1 | 7/2003 | Farmer et al. | |
| 2003/0135346 A1 | 7/2003 | Farmer et al. | |
| 2003/0234519 A1 | 12/2003 | Farmer | |

FOREIGN PATENT DOCUMENTS

| | | |
|---|---|---|
| JP | 61-66905 | 5/1986 |
| JP | 61-66906 | 5/1986 |
| WO | WO02/30717 | 4/2002 |

OTHER PUBLICATIONS http://academic.mu.edu/phys/mattysd/web226/L0129.htm,Jan.29, 2001, "Point Operations", (pp. 1-4).*

Hentea, IEEE Publication, 1993, "Algorithm for automatic threshold determination for image segmentation". (pp. 535-538).*

Kikuch et al., IEEE Publication, 1999, "Recognition process using feature data fusion for imaging system". (pp. I-577-I582).*

Collet et al., IEEE Publication, 1994, "Active Contour Models for infrared cloudy shapes segmentation". (pp. II-444-II-448).*

Oddo et al., IEEE Publication, 2000, "Automated Road extraction via the hybridization of self-organization and model based techniques". (pp. 32-38).*

"GPS-Based Vehicle Tracking" by Jeffrey Pusan from www.securitydriver.com/aic/stories/article-97.html.

Greg Welch and Gary Bishop, "*An Introduction to the Kalman Filter*", Sep. 4, 1997.

* cited by examiner

IMAGE SEGMENTATION SYSTEM AND METHOD

RELATED APPLICATIONS

This Continuation-In-Part application claims the benefit of the following U.S. utility applications: "A RULES-BASED OCCUPANT CLASSIFICATION SYSTEM FOR AIRBAG DEPLOYMENT," Ser. No. 09/870,151, filed on May 30, 2001 now U.S. Pat. No. 6,459,974; "IMAGE PROCESSNG SYSTEM FOR DYNAMIC SUPPRESSION OF AIRBAGS USING MULTIPLE MODEL LIKELIHOODS TO INFER THREE DIMENSIONAL INFORMATION," Ser. No. 09/901,805, filed on Jul. 10, 2001; and "IMAGE PROCESSING SYSTEM FOR ESTIMATING THE ENERGY TRANSFER OF AN OCCUPANT INTO AN AIRBAG," Ser. No. 10/006,654, filed on Nov. 5, 2001 now U.S. Pat. No. 6,577,936, the contents of which are hereby by incorporated by reference in their entirety.

BACKGROUND OF THE INVENTION

The present invention relates in general to systems and techniques used to isolate a segmented image of a person or object from an ambient image of the area surrounding and including the person or object. In particular, the present invention relates to isolating a segmented image of an occupant from the ambient image of an occupant, where the ambient image of the occupant includes both the occupant and the area surrounding the occupant, so that the deployment of an airbag can be prevented or modified due to the characteristics of the segmented image of the occupant.

There are many situations in which it is desirable to isolate the segmented image of a "targeted" person or object from an ambient image which includes images ancillary to the "targeted" person or object. Airbag deployment systems can be one application of such a technology. Airbag deployment systems may need to make various deployment decisions that relate in one way or another to the image of an occupant. Airbag deployment systems can alter their behavior based on a wide variety of factors that ultimately relate in one way or another to the occupant. The type of occupant, the proximity of an occupant to the airbag, the velocity and acceleration of an occupant, the mass of the occupant, the amount of energy an airbag needs to absorb as a result of an impact between the airbag and the occupant, and other airbag deployment considerations may utilize characteristics of the occupant that can be obtained from a segmented image of the occupant.

There are significant obstacles in the existing art with regards to image segmentation techniques. First, prior art techniques do not function well in darker environments, such as when a car is being driven at night. Certain parts of a human occupant image can be rendered virtually invisible by darkness, depriving an airbag deployment system of accurate information. Second, such techniques do not compensate for varying degrees of darkness resulting from the fact that different parts of the occupant will be at different angles and distances from a sensor or light source. It is beneficial for different regions in the occupant image to be treated differently. Third, existing techniques do not maximize the intelligence that can be incorporated into the segmentation process when there is a specific type of segmented image. There are anatomical aspects of a human occupant that can be used to refine the raw segmented image of an occupant that is captured by a camera or other sensor. For example, the fact that all parts of a human being are connected, and the inherent nature of those connections, can enhance the ability of a segmentation process to determine which image pixels relate to the occupant, and which image pixels relate the area surrounding the occupant. The knowledge that the occupant is likely in some sort of seated position can also be used to apply more intelligence to a raw ambient image.

SUMMARY OF THE INVENTION

This invention relates to an image segmentation system or method that can be used to generate a segmented image of an occupant from an ambient image which includes the occupant, as well the environment surrounding the occupant. An airbag deployment system can then utilize the segmented image of the occupant to determine whether or not an airbag should be deployed, and any parameters surrounding that deployment.

The invention consists of two primary components, an image thresholding subsystem and a gap filling subsystem. The image thresholding system can transform an ambient image into a binary image. Each pixel relating to the occupant can be set at one binary value and every pixel not clearly relating to the occupant can be set at a different binary value. An image threshold using a characteristic such as luminosity can be used to determine the binary value at which a particular pixel should be set. Different regions of the ambient image can utilize different image thresholds to account for differences in lighting caused by shadows, differing distances to light sources, or other causes. The image threshold can incorporate probability analysis into the segmentation process using a cumulative distribution function. As a general matter, the image thresholding subsystem can take a "cynical" view with respect to whether a particular pixel represents the image of the occupant. The image thresholding subsystem can attempt to determine which pixels clearly represent the image of the occupant, and can treat "gray area" pixels as representing aspects of the ambient image that are not the occupant. It is not a hindrance to the invention for the image threshold to classify the majority of the ambient image as not relating to the occupant image.

The gap filling subsystem can incorporate into the characteristic of a particular pixel the characteristics of pixels in the vicinity of that particular pixel being set by the subsystem. The gap filling subsystem can fill in gaps left by the overly conservative approach of the image thresholding subsystem. The gap filling subsystem can apply morphological erosion and dilation techniques to remove spurious regions of pixels, e.g. pixel values that are out of place in the context of neighboring pixels. The subsystem can apply a momentum-based heuristic, which incorporates into the value of a particular pixel, the "momentum" of nearby pixel value determinations. The subsystem can also apply a gravity-based heuristic, which incorporates gravitational concepts of mass and distance into a particular pixel value.

The system can output the occupant image in various different forms, including generating an upper ellipse to represent the upper torso of the occupant.

Various aspects of this invention will become apparent to those skilled in the art from the following detailed description of the preferred embodiment, when read in light of the accompanying drawings.

DETAILED DESCRIPTION OF THE PREFERRED EMBODIMENT

A. Partial View of Surrounding Environment

Figure 1:
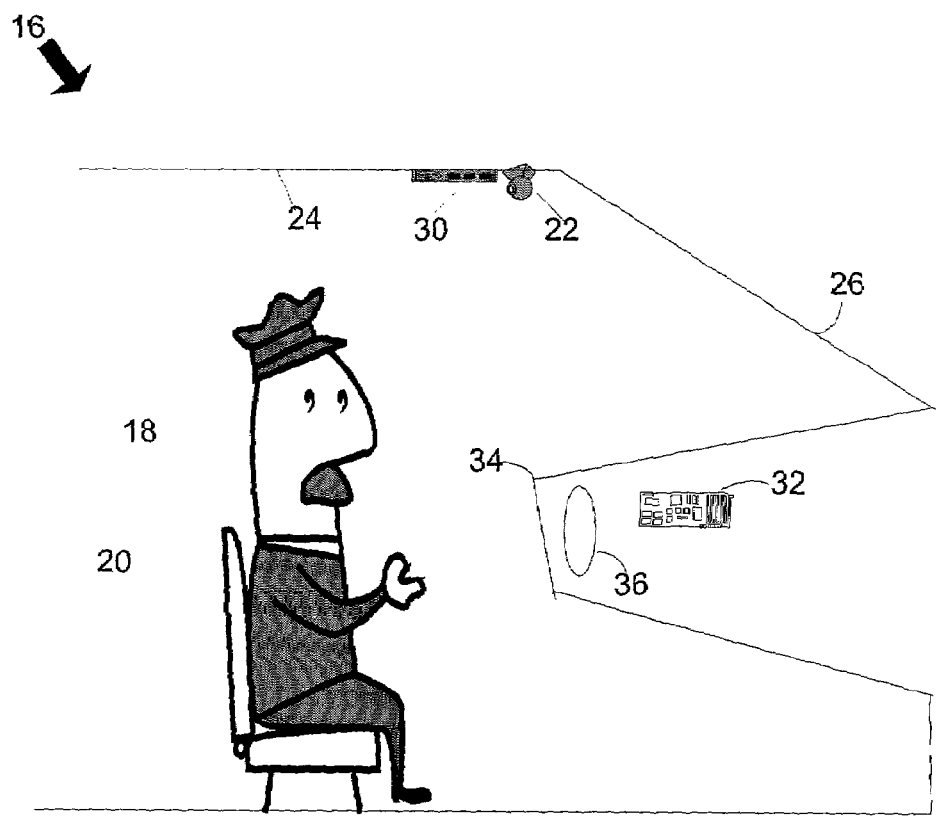
FIG. 1 shows a partial view of the surrounding environment for several potential embodiments of the invention.

Referring now to the drawings, illustrated in FIG. 1 is a partial view of the surrounding environment for potentially several different embodiments of an image segmentation system 16. If an occupant 18 is present, the occupant 18 can sit on a seat 20. In some embodiments, a camera or any other sensor capable of rapidly capturing images (collectively "camera" 22) can be attached in a roof liner 24, above the occupant 18 and closer to a front windshield 26 than the occupant 18. The camera 22 can be placed in a slightly downward angle towards the occupant 18 in order to capture changes in the angle of the occupant's 18 upper torso resulting from forward or backward movement in the seat 20. There are many potential locations for a camera 22 that are well known in the art.

In some embodiments, the camera 22 can incorporate or include an infrared light source operating on direct current to provide constant illumination in dark settings. The system 16 is designed for use in dark conditions such as night time, fog, heavy rain, significant clouds, solar eclipses, and any other environment darker than typical daylight conditions. The system 16 can be used in brighter light conditions as well. Use of infrared lighting can hide the use of the light source from the occupant 18. Alternative embodiments may utilize one or more of the following: light sources separate from the camera; light sources emitting light other than infrared light; and light emitted only in a periodic manner utilizing alternating current. The system 16 can incorporate a wide range of other lighting and camera 22 configurations.

A computer system 30 for applying the image segmentation technique may be located virtually anywhere in or on a vehicle. Preferably, the computer system 30 is located near the camera 22 to avoid sending camera images through long wires. The computer system 30 can be any type of computer or device capable of incorporating the processing performed by an image thresholding subsystem and a gap filling subsystem. The processing that can be performed by such subsystems is disclosed in FIG. 11, and is described in greater detail below. An airbag controller 32 is shown in an instrument panel 34, although the present invention could still function even if the airbag controller 32 were located in a different environment. Similarly, an airbag deployment system 36 is preferably located in the instrument panel 34 in front of the occupant 18 and the seat 20, although alternative locations can be used by the system 16.

B. High Level Process Flow

Figure 2:
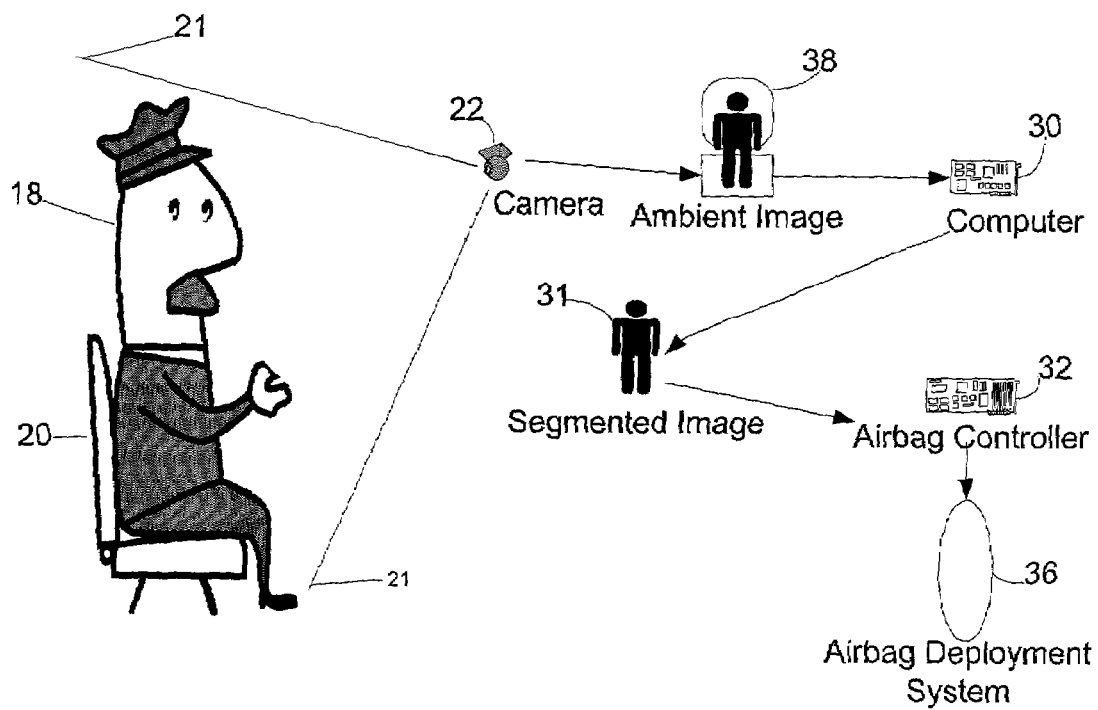
FIG. 2 shows a high-level process flow of the image processing system for several potential embodiments of the invention.

FIG. 2 discloses a high level flowchart illustrating the use of the image segmentation system 16. An ambient image 38 of a seat area 21 including both the occupant 18 and the seat area 21 can be captured by the camera 22. In the figure, the seat area 21 includes the entire occupant 18, although under many different circumstances and embodiments, only a portion of the occupant's 18 image will be captured, particularly if the camera 22 is positioned in a location where the lower extremities may not be viewable. The ambient image 38 can be sent to the computer 30. The computer 30 can isolate a segmented image 31 of the occupant 18 from the ambient image 38. The process by which the computer 30 performs image segmentation is described in greater detail below, and is disclosed in FIG. 11. The segmented image 31 can then be analyzed to determine the appropriate airbag deployment decision. For example, the segmented image 31 can be used to determine if the occupant 18 will be too close to the deploying airbag 36 at the time of deployment. The analysis and characteristics of the segmented image 31 can be sent to the airbag controller 32, allowing the airbag deployment system 36 to make the appropriate deployment decision with the information obtained relating to the occupant 18.

C. Histogram of Pixel Characterstics

Figure 3:
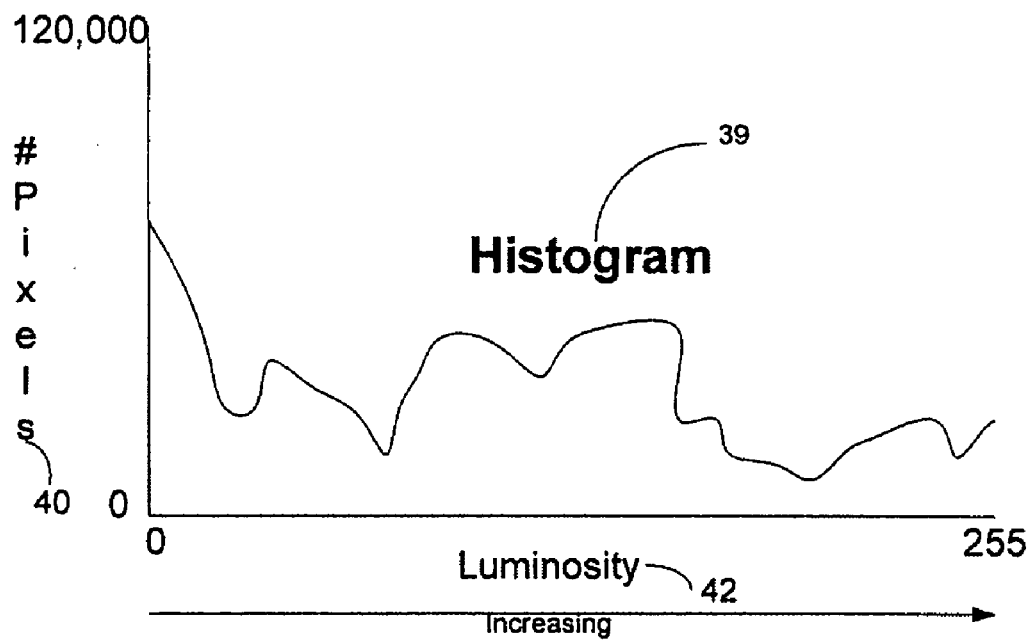
FIG. 3 is a histogram tabulating the number of pixels that possess a particular luminosity value.

FIG. 3 discloses an example of a type of histogram 39 that can be used by the system 16. Any image captured by the camera 22, including the segmented image 31 and the ambient image 38, can be divided into one or more pixels 40. As a general matter, the greater the number of pixels 40, the better the resolution of the image 38. In a preferred embodiment, the width of the ambient image 38 should be at least approximately 400 pixels across and the ambient image 38 should be at least approximately 300 pixels in height. If there are too few pixels, it can be difficult to isolate the segmented image 31 from the ambient image 38. However, the number of pixels is dependent upon the type and model of camera 22, and cameras 22 generally become more expensive as the number of pixels increases. A standard video camera can capture an image roughly 400 pixels across and 300 pixels in height. Such an embodiment captures a sufficiently detailed ambient image 38 while remaining relatively inexpensive because a standard non-customized camera 22 can be used. Thus, a preferred embodiment will use approximately 120,000 (400×300) total pixels 40. The number of pixels 40 can depend on the camera 22 used by the system 16. Each pixel 40 can possess one or more different pixel characteristics or attributes (collectively "characteristics") 42 used by the system 16 to isolate the segmented image 31 from the ambient image 38. Pixels 40 can have one or more pixel characteristics 42, with each characteristic represented by one or more pixel values. One example of a pixel characteristic 42 is a luminosity measurement ("luminosity"). The pixel characteristics 42 of luminosity can be measured, stored, and manipulated as a pixel value relating to the particular pixel. In a preferred embodiment, the luminosity value 42 is the initial pixel value for the pixels 40 in the ambient image 38, and luminosity can be represented in a numerical pixel value between 0 (darkest possible luminosity) and 255 (brightest possible luminosity). Alternative pixel characteristics can include color, heat, a weighted combination of two or more characteristics, or any other characteristic that could potentially be used to distinguish the segmented image 31 from the ambient image 38.

In some embodiments of the system 16, luminosity 42 can be represented by a numerical pixel value between 0 and 255, as disclosed in the figure. On such a scale, a luminosity of 0 can indicate the darkest possible luminosity (black), and a luminosity of 255 can indicate the brightest possible luminosity (white). Alternative embodiments can use histograms 39 of differing numerical scales, and even characteristics 42 other than luminosity.

The histogram 39 in the figure records the number of pixels 40 with a particular individual or combination of pixel characteristics 42 (collectively "characteristic"). The histogram 39 records the aggregate number of pixels 40 that possess a particular pixel value. The data in the histogram 39 can be used by the system 16 to divide some or preferably all the pixels 40 in the ambient image 38 into two or more pixel categories. A first category of pixels 40 can include those pixels that clearly represent the segmented image 31 of the occupant 18. Pixels 40 in that first category can be referred to as occupant pixels 40. A second category of pixels 40 can include those pixels 40 which either clearly represent images not relating to the occupant 18, or images that may or may not represent the occupant ("gray area images" or "ambient pixels"). In a preferred embodiment, all pixels 40 are categorized into one of two categories, and all occupant pixels 40 are set to a binary value of "1" while all ambient pixels 40 are set to a binary value of "0". The system 16 can use the histogram 39 and an image threshold to categorize the pixels 40 in the ambient image 38. The process of using the image threshold to set pixel values to a binary value is described in greater detail below.

D. Image Threshold

Figure 4:
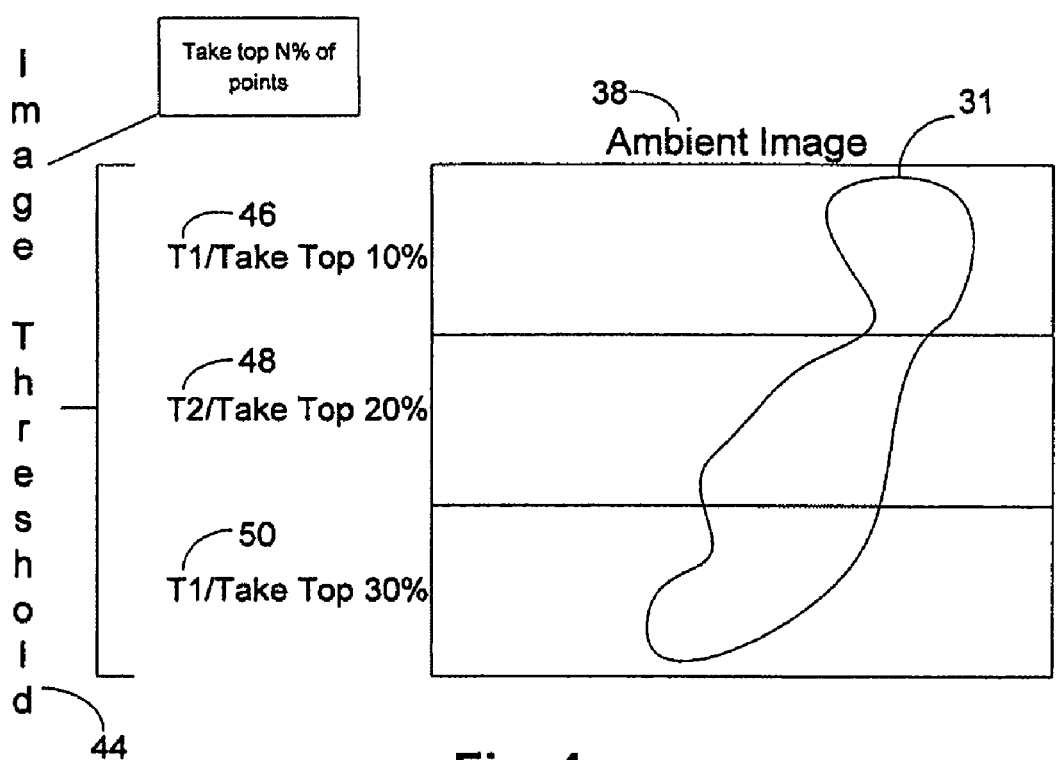
FIG. 4 is a diagram showing how multiple different image threshold can be applied to a single ambient image.

FIG. 4 is a diagram illustrating a preferred embodiment of a system 16 utilizing three image thresholds 44. FIG. 4 is a diagram of the ambient image 38 including the segmented image 31 of the occupant 18, at the time in which image thresholding is to be performed by the system 16. As described above, the ambient image 38 is composed of pixels 40. Each pixel 40 has a pixel characteristic 42 such as luminosity. Pixels 40 can have different values of a particular characteristic 42. For example, some pixels 255 may have very high luminosity values such as 255 while other pixels 40 may have very low luminosity values such as 0. In terms of the characteristic of luminosity, higher pixel values tend to represent the occupant 18 and lower pixel values tend to represent images of the surrounding area. The imaging threshold process seeks out the top N % of pixels 40 on the basis of pixel characteristics such as luminosity and identifies those pixels as representing the segmented image 31 of the occupant 18. The remaining pixels 40 cannot confidently be said to represent the segmented image 31 of the occupant 18, and thus can be categorized by the system 16 as pixels not relating to the occupant 18. The histogram 39 discussed above facilitates the ability of the system 16 to calculate the image threshold (with respect to a particular pixel characteristic) required to "pick off" the top N % of the pixels 40.

Alternative embodiments can use as few as one image threshold 44 or as many image thresholds 44 as are desired.

As discussed above, the system 16 can use an image threshold 44 in conjunction with the histogram 39 to divide pixels 40 into two or more various pixel categories.

Only pixels 40 in the top N % should be initially identified as representing the occupant 18. The histogram 39 facilitates the ability of the system 16 to rank pixel characteristics 42 in order to identify those pixels 40 most likely to represent the segmented image 31 of the occupant 18. For example, pixels 40 with a luminosity (pixel value) of Y or greater can be categorized as representing the segmented image 31. All other pixels 40 can be categorized as representing ancillary images (e.g. "ambient pixels") in the ambient image 38. In a preferred embodiment, "gray area" pixels should initially be placed in the ambient pixels 40 category.

N should generally be set no higher than 50, and no lower than 10. The system 16 can be designed to take an initially conservative approach with respect to which pixels 40 represent the occupant's 18 segmented image 31 because subsequent processing by the system 16 is designed to fill in the gaps left by the conservative approach. In a preferred embodiment, different areas in the ambient image 38 have one of three different image thresholds 44 applied by the system 16 depending on the location of the particular pixel 40 with respect to the ambient image 31. The uppermost locations in the ambient image 38 are subject to the best lighting, and thus the system 16 can incorporate a top-tier image threshold 46 designed to select only those pixels 40 in the top 10% (N=10). Middle locations in the ambient image 38 are generally subject to less illuminating lighting, more significant shadows, and poorer resolution generally than those pixels 40 in the upper part of the ambient image 38. Thus, the system 16 can incorporate an middle-tier image threshold 48 designed to select only those pixels 40 in the top 20% (N=20). Pixels 40 closest to the bottom of the ambient image 38 can incorporate a bottom-tier image threshold 50 using the top 30% (N=30) of the pixels 40 as pixels 40 representing the segmented image 31 of the occupant 18. The high percentage is desirable because the lighting at the lower part of the ambient image 38 represents pixel 40 locations in the seat area 21 that are poorly lit with respect to other pixel 40 locations. Alternative embodiments can utilize a different number of image thresholds 44, and a wide variety of different N values can be used by those tiers.

The image threshold(s) 44 used by the system 16 should incorporate the concept of selecting a top percentile of pixels 40 as representing the segmented image 31 on the basis of pixel characteristics 42, such as luminosity, and the corresponding pixel values relating to that characteristic. A pixel characteristic 42 such as luminosity can be represented by a value Y, such as 255, and should not be a percentile or probability such as 10% or N %. A cumulative distribution function can be used to convert a pixel value or characteristic such as Y into a probability or percentile such as N, or a probability or percentile using N into a measured characteristic 42 value such as Y.

In a preferred embodiment, the pixel values for the top N % of pixels (those pixels with characteristics greater than or equal to Y) can be set to a binary value such as "1." In a preferred embodiment, pixels 40 representing the segmented image 31 of the occupant 18 can be referred to as the binary image of the occupant 18, or as occupant pixel 40. Other pixel values can be set to a different binary value, such as "0" and can be classified as ambient pixels 40. Alternative embodiments can use a greater number of categories with different types and varieties of pixel values.

E. Cumulative Distribution Function

Figure 5:
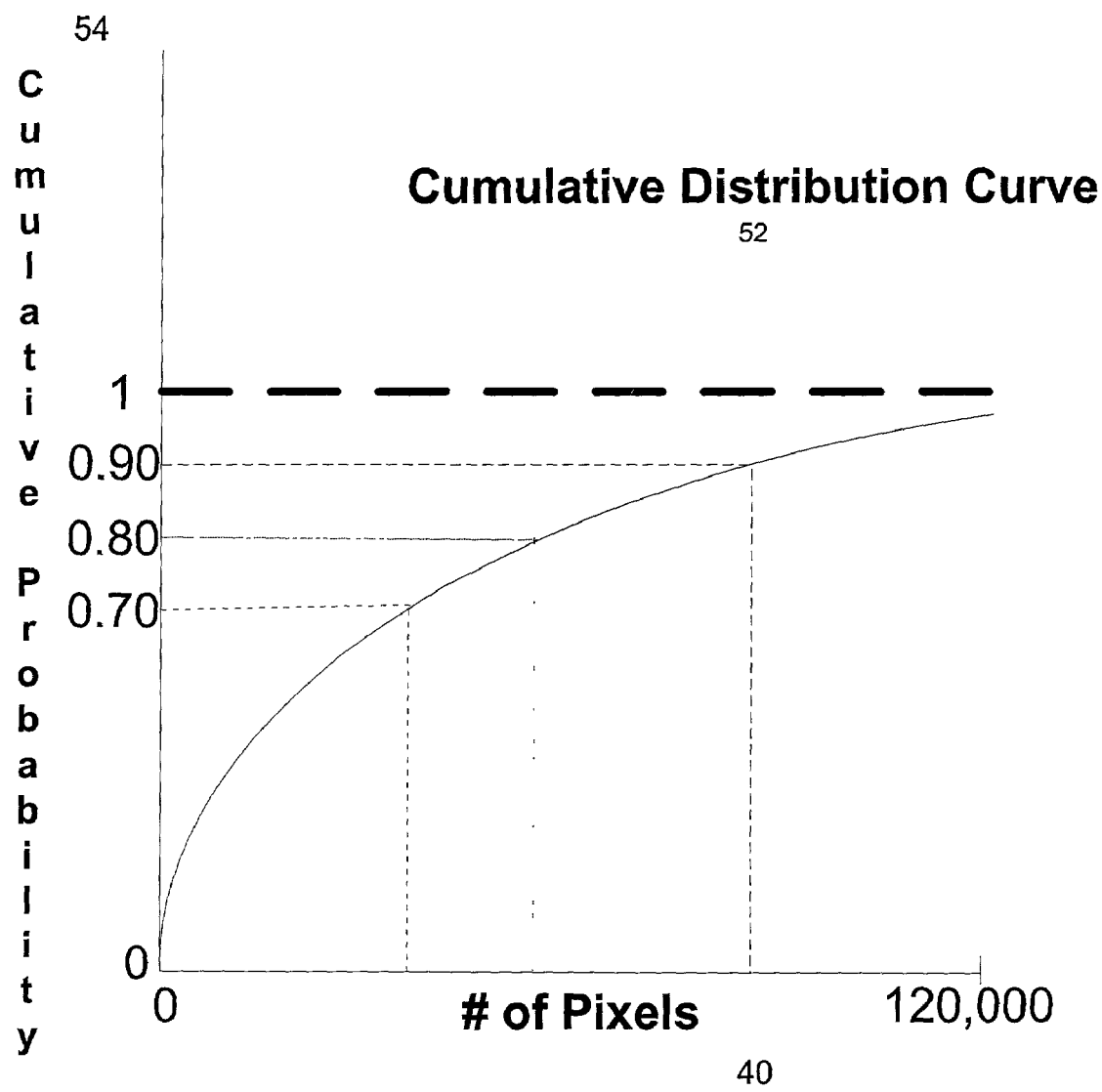
FIG. 5 is a graph of a cumulative distribution function that can be utilized by the image thresholding subsystem.

The ability to select a top N % of pixels 40 and select those pixels 40 as representing the occupant 18 (e.g. occupant pixels 40) can be done using a cumulative distribution function 52 based on the numerical measured value (Y) associated with a pixel characteristic 42. FIG. 5 discloses a cumulative distribution curve 52 that can be derived from the histogram disclosed in FIG. 3. The vertical axis can represent a cumulative probability 54 that that the system 16 has not mistakenly classified any pixels 40 as representing the occupant 18. The cumulative probability 54 can be the value of 1–N. For example, selecting the top 10% of pixels will result in a probability of 0.9, with 0.9 representing the probability that an ambient pixel has not been mistakenly identified as a segmented pixel. Absolute certainty (a probability of 1.0) can only be achieved by assuming all 120,000 pixels are ambient pixels 40, e.g. that no pixel 40 represents the segmented image 31 of the occupant 18. Such certainty is not helpful to the system 16, because it does not provide a starting point at which to build out the shape of the occupant 18. Conversely, a low standard of accuracy such as a value of 0 or a value close to 0, does not exclude enough pixels 40 from the category of pixels 40 representing the segmented image 31.

Probabilities such as 0.90, 0.80. or 0.70 are preferable because they generally indicate a high probability of accuracy while at the same time providing a substantial base of occupant 18 pixels 40 upon which to expand upon using the gap processing subsystem, described in greater detail below. In a preferred embodiment, multi-image threshold 44 systems 16 will have as many cumulative distribution functions 52 as there are image thresholds 44.

F. Morphological Processing

The system 16 can incorporate a morphological heuristic into the gap processing subsystem, described in greater detail below. The gap processing heuristic applied by the gap processing subsystem can include the performing of a morphological heuristic. As described both above and below, the system 16 uses pixel values relating to a pixel to perform analysis on a pixel 40 as to whether the pixel is an occupant pixel 40, an ambient pixel 40, or some other category of pixel 40 (some embodiments may have three or more different pixel categories).

Morphological processing can incorporate into a particular pixel value, the pixel values of other pixels 40 in the vicinity ("vicinity pixels" or "vicinity pixel values") of the particular pixel being analyzed or set. Morphological erosion can remove spurious objects, e.g., untrue indications that a pixel 40 represents the segmented image 31. Morphological erosion can be performed in more than one direction. For example, erosion can be performed in a vertical direction, in a horizontal direction, or even in a diagonal direction. Morphological dilation can be performed to "grow out" the segmented image 31 reduced by the "conservative" image thresholding process. Morphological dilation can also be performed in many different directions. Illustrated in FIGS. 6a and 6b are examples of morphological processing performed in the vertical and horizontal directions.

In a preferred embodiment, the order of morphological processing is as follows: vertical morphological erosion; vertical morphological dilation; horizontal morphological erosion; and horizontal morphological dilation. Alternative embodiments may incorporate only some of these processes, and such systems 16 may perform the processing in a different order.

Figure 6A:
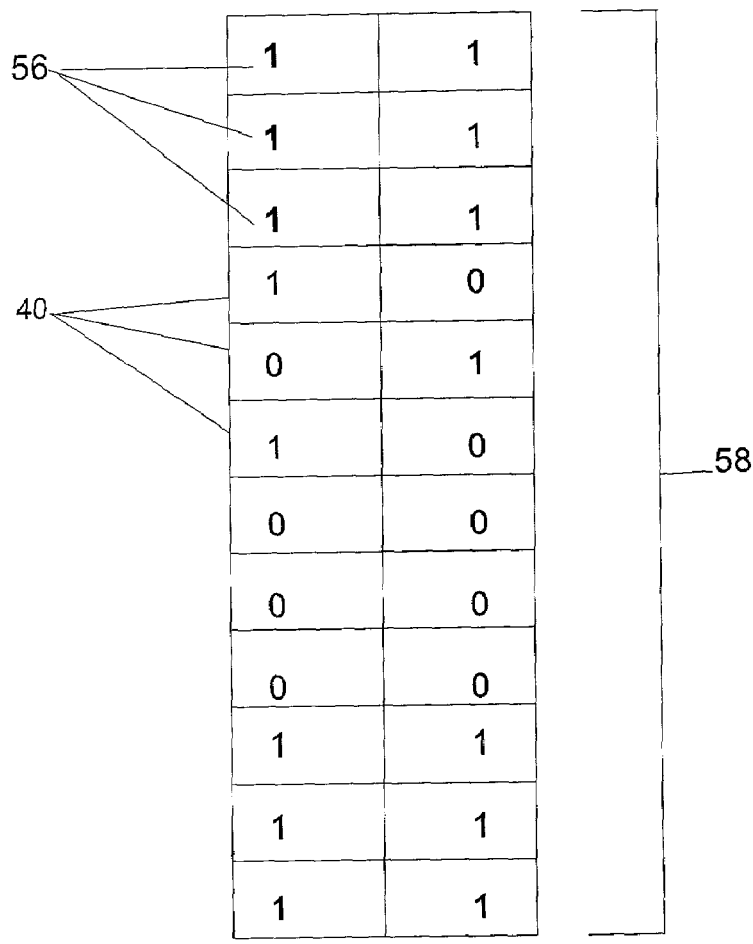
FIG. 6a shows a vertical grouping of pixels subject to morphological erosion and dilation.
Figure 6B:
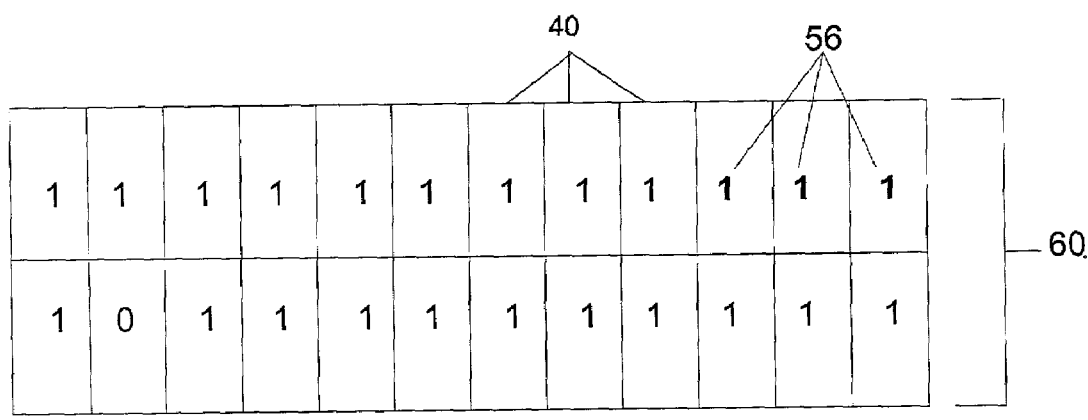
FIG. 6b shows a horizontal grouping of pixels subject to morphological erosion and dilation.

FIG. 6a is a diagram illustrating a vertical group 58 of pixels 40 used to perform vertical morphological processing. Vertical morphological processing can group pixels 40 together in the vertical group 58. In a preferred embodiment, the vertical group 58 includes 12 vertical rows of pixels 40, which each row including 2 columns of pixels. Alternative embodiments may use vertical groups 58 with different numbers of rows and columns. Each pixel 40 in the group 58 has at least one pixel value 56, such as a binary number in a preferred embodiment.

Vertical morphological erosion takes a "pessimistic" or "conservative" view of whether or not a particular pixel 40 represents the segmented image 31, e.g. whether a pixel 40 is an occupant pixel 40. If even one pixel 40 in the vertical group 58 has a pixel value 56 indicating that the pixel does not represent the segmented image 31 of the occupant (a pixel value 56 of "0" in a preferred embodiment), then all of the pixel values 56 in the vertical group 58 can be set to that same value.

Vertical morphological dilation can take an "optimistic" view of whether or not a particular pixel 40 represents the segmented image 31. If even one pixel value 56 in the vertical group 58 indicates that the pixel 40 represents the segmented image 31 (a value 56 of "1" in a preferred embodiment), then each of the pixel values 56 in the vertical group 58 can be set to that same pixel value 56.

FIG. 6b is a diagram illustrating horizontal morphological processing. Horizontal morphological processing can group pixels 40 together in a horizontal group 60 of sequential pixels. In a preferred embodiment, a horizontal group consists of 2 vertical rows of sequential pixels 40, which each row including 12 columns of sequential pixels 40. Alternative embodiments may use horizontal groups 60 with different numbers of rows and columns. Each pixel 40 in the group 60 has at least one pixel value 56, such as a binary number in a preferred embodiment.

Horizontal morphological erosion takes a "pessimistic" or "conservative" view of whether or not a particular pixel 40 represents the segmented image 31, e.g. whether a pixel 40 is an occupant pixel 40. If even one pixel 40 in the horizontal group 60 has a pixel value 56 indicating that the pixel does not represent the segmented image 31 of the occupant (a pixel value 56 of "0" in a preferred embodiment), then all of the pixel values 56 in the horizontal group 60 can be set to that same value, classifying each pixel 40 in the horizontal group 60 as an ambient pixel 40.

Horizontal morphological dilation takes an "optimistic" view of whether or not a particular pixel 40 represents the segmented image 31. If even one pixel value 56 in the horizontal group 60 indicates that the pixel represents the segmented image 31 (a value of "1" in a preferred embodiment), then each of the pixel values 56 in the vertical group 58 can be set to that same pixel value 56.

Some embodiments may set pixel values 56 to non-binary numbers, or even to non-numerical characteristics such as letters, etc. Some embodiments may allow a horizontal group 60 to overlap with another horizontal group 60 and a vertical group 58 to overlap with another vertical group 58. Embodiments using overlapping horizontal groups 60 or overlapping vertical groups 58 can incorporate a one-to-one relationship between the particular pixel value 56 being set, and the particular horizontal group 60 or vertical group 58 being used to set that particular pixel 40. In other embodiments, a pixel 40 can only belong to one horizontal group 60 and one vertical group 58.

G. Momentum-based Processing

The system 20 can incorporate momentum-based processing to set pixel values 56. The underlying logic to such an approach is that if the last X consecutive pixels 40 represent the segmented image 31 of the occupant 18, then it is more likely than not that the next sequential pixel 40 (pixel X+1) in the location-based sequence of pixels, will also represent the occupant 18. The momentum-based heuristic is one means by which the system 30 can determine the appropriate value of a particular pixel by looking to and incorporating the pixel values of pixels in the vicinity ("vicinity pixels" or "vicinity pixel values") of the particular pixel that is subject to analysis by the system 30. Momentum-based processing can be incorporated into the gap processing subsystem, which is described in greater detail below.

Figure 7:
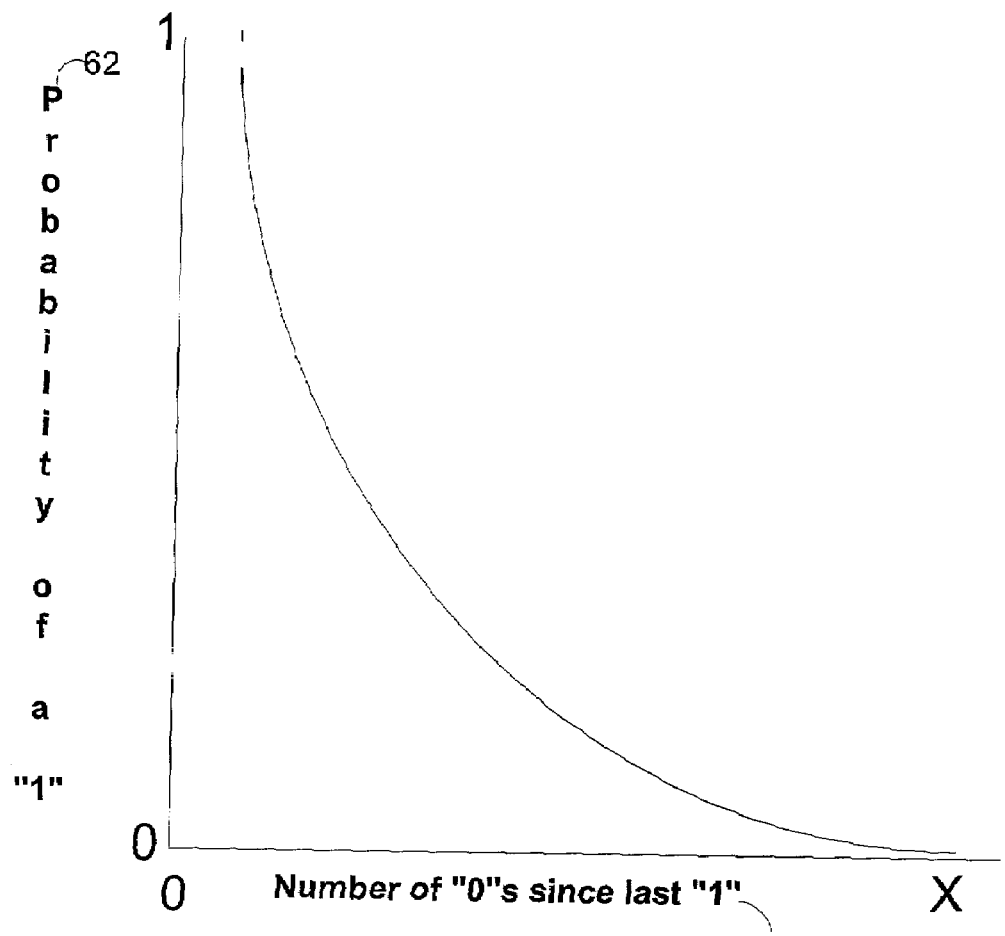
FIG. 7 is a probability graph incorporating the concept of a momentum-based gap filling approach.

FIG. 7 is one illustration of a graph useful for momentum-based analysis by the momentum-based heuristic. A probability 62 of a particular pixel 40 having a pixel value 56 representing the segmented image 31 decreases with each consecutive pixel value 56 representing an ambient image 38. Momentum-based processing can be done in two dimensions, i.e. in both the vertical and horizontal directions, although vertical momentum processing is generally more useful in embodiments relating to occupants 18 in a seated position. Momentum-based processing can be particularly effective in trying to fill gaps left by the seatbelt or hat, or a location of the occupant 18 often blocked by shadow such as the neck of the occupant 18.

When a particular pixel 40 has a pixel value 56 indicating that the particular pixel 40 represents the segmented image 31 of the occupant 18, that particular pixel 40 can be referred to as an occupant pixel 40. When a particular pixel 40 has a pixel value 56 indicating that the particular pixel 40 does not or may not represent the segmented image 31 of the occupant 18, that particular pixel 40 can be referred to as an ambient pixel 40.

Figure 8:
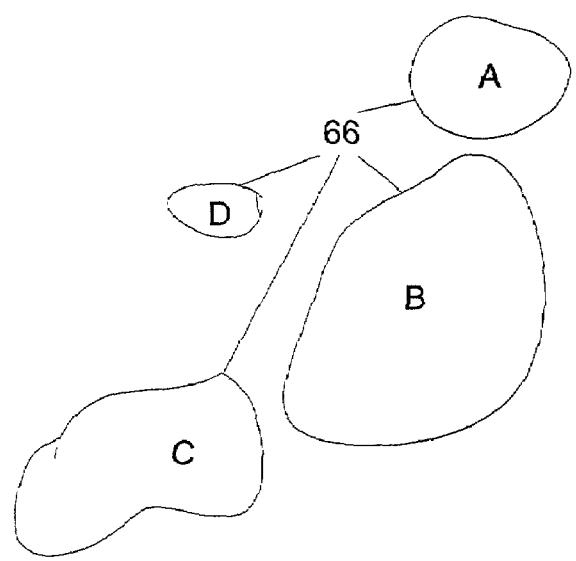
FIG. 8 is a diagram of pixel regions that can be processed with a gravity-based heuristic.

FIG. 8 is a diagram illustrating one example of one or more pixel regions 66 made up of occupant pixels 40. Each pixel region 66 includes at least one occupant pixel. For two occupant pixels 40 to be in the same pixel region 66, those two occupant pixels 40 must be connected by a "chain" of occupant pixels 40, with each occupant pixel 40 in the chain adjacent to at least one other occupant pixel in the chain. A typical ambient image 38 may include between 3 and 5 pixel regions 66, although ambient images 38 may have as few as 1 pixel region 66 or as potentially as many pixel regions 66 as there are occupant pixels 40.

Momentum-based processing can compute the sequential number of occupant pixels 40 in either the horizontal or vertical direction (only the vertical direction in a preferred embodiment) in a particular row or column (only vertical columns in a preferred embodiment) in the ambient image 38. The underlying logic of gap-based processing is that the pixel values (relating to pixels in the vicinity of the pixel being set) can be incorporated into the pixel being set. Momentum-based processing incorporates the concept that a series of sequential occupant pixels makes it more likely that an intervening ambient pixel or two is the result of misidentification by the system 16. For example, if two pixel regions 66 are separated by a gap of 4 ambient sequential pixels 44, the "momentum" associated with the occupant pixels 40 in the two pixel regions 66 may be sufficient to fill the gap and join the two regions 66. The greater the number of sequential or consecutive occupant pixels 40, the greater the "momentum" to allow the filling of a gap of ambient pixels 40.

A momentum counter ("counter") can be used to determine the amount of momentum between pixel regions 66. The counter can be incremented or added to each time the next pixel 40 in a sequence of pixels ("sequential pixels") is an occupant pixel 40. Conversely, a value can be subtracted from the counter each time the next sequential pixel 40 is an ambient pixel 40. Momentum-based processing can attribute different weights to an occupant pixel 40 and an ambient pixel 40. For example, an occupant pixel 40 could result in a value of 4 being added to the counter, while an ambient pixel 40 could result in a value of 1 being subtracted from the counter. Different embodiments can incorporate a wide variety of different weights to the momentum counter. In a preferred embodiment, an occupant pixel increments the counter by 1 and an ambient pixel results in a value of 1 being subtracted from the counter. When the counter reaches a number less than or equal to zero, the system 16 can cease trying to bridge the gap of ambient pixels 40 between the pixel regions 66 of occupant pixels 40.

An example of the momentum-based processing and the counter can be seen with respect to the pixel values in Table 1 below. For the purpose of distinguishing pixel positions from pixel values, letters are used in the example to represent the relative horizontal positions of the pixels. In many embodiments, a numerical coordinate position is used to identify the location of a pixel, and thus the position of a pixel would be identified by a numerical value. In the example, each occupant pixel 40 increments the counter by 1 and each ambient pixel 40 decrements the counter by 1.

TABLE 1

| Position | A | B | C | D | E | F | G | H | I | J | K | L | M | N |
|---|---|---|---|---|---|---|---|---|---|---|---|---|---|---|
| Value | 0 | 0 | 0 | 1 | 0 | 0 | 1 | 1 | 1 | 0 | 0 | 0 | 0 | 0 |

The three 1's at positions G, H, and I represent the largest region of 1's in the row, so momentum-based processing in a leftward direction will begin at position I. I, H, and G each have pixel values of "1" so each of those pixels increments the counter by 1. Thus, the counter value at position G is 3. F has a pixel value of 0, but the counter has a value greater than 0 so the pixel value at F is changed to a 1 and the counter is decreased by 1 to a value of 2. E has a pixel value of 0, but the counter has a value of 2 which is greater than 0, so the counter goes down to a value of 1 and the pixel value at E is changed to 1. D has a pixel value of 1, so the counter is incremented to a value of 2. C has a pixel value of 0, but the counter value of 2 is greater than 0, so the pixel value at C is changed to a 1 and the counter has a value of 1. B also has a pixel value of 0, but the counter value of 1 is greater than 0, so B is changed to a value of 1 and the counter is changed to a value of 0. A has a pixel value of 0, and the counter value is 0, so there is no momentum to traverse the 0 value of A. Thus the right to left horizontal process stops.

Moving in a left to right direction the process begins with G, the left-most 1 in the pixel region of G, H, and I. The counter is incremented to a value of 1 at G, a value of 2 at H, and a value of 3 at I. J has a pixel value of 0 which is then changed to a value of 1, and 1 is subtracted from the counter value which then becomes 2. K has a pixel value of 0 which is changed to 1, but the counter value is then decreased to 1. The pixel value at L is similarly changed from 0 to 1, but the counter value is then decreased to 0. M has a pixel value of 0, and the counter value at M is 0, so the process stops. The process never even reaches pixel position N. Table 2 discloses what the resulting pixel values after the horizontal momentum-based processing of the row.

TABLE 2

| Position | A | B | C | D | E | F | G | H | I | J | K | L | M | N |
|---|---|---|---|---|---|---|---|---|---|---|---|---|---|---|
| Value | 0 | 1 | 1 | 1 | 1 | 1 | 1 | 1 | 1 | 1 | 1 | 1 | 0 | 0 |

There are many different modifications and variations one can make to the example above. The values added to or subtracted from the counter can modified. The starting and end points can similarly be varied from embodiment to embodiment. There are many different heuristics and methodologies in which the momentum of occupant pixels can traverse one or more ambient pixels.

H. Gravity-based Processing

The pixel regions 66 of occupant pixels 40 illustrated by the example in FIG. 8 can also be used by the system 16 to perform gravity-based processing using a gravity-based heuristic. Gravity-based processing is one means by which the system 30 can determine the appropriate pixel value 56 relating to a particular pixel 40 by looking to and incorporating the pixel values 56 of other pixels 40 in the vicinity of the particular pixel that is subject to analysis by the system 30. Gravity-based processing can include assigning a unique identifier to each pixel region 66, as illustrated in FIG. 8. The system 16 can track region characteristics such as region location and region size. The largest region 66 is typically the upper torso of the occupant 18.

Gravity-based processing and the gravity-based heuristic incorporates the assumption that ambient pixels 40 in the general vicinity of the pixel region 66 of occupant pixels 40 (a group of occupant pixels where each occupant pixel is adjacent to at least one other occupant pixel) may actually be misidentified occupant pixels 40. The system 16 can incorporate a heuristic resembling the manner in which physics measures the impact of gravity on an object. The size of the pixel region 66 and the distance between the pixel region 66 and the potentially misidentified ambient pixel 40 are two potentially important variables for gravity-based processing. The "gravity" of a particular pixel region 66 can be compared to a predetermined threshold to determine whether or not an occupant pixel 40 has been misidentified as an ambient pixel 40.

$$\text{Gravity} = \frac{GMm}{r^2} > \text{pre-computed threshold}$$

In the equation above "G" is the "gravitational constant." It determines the strength with which pixels are attracted together. This parameter or characteristic is determined by the imagery and target types being analyzed to determine the amount of attraction needed to accomplish a complete segmentation. Different embodiments will have different "G" values. "M" can represent the aggregate total of the initial pixel value 56 for a characteristic 42, such as a luminosity value between 0 and 255 for each occupant pixel 40 in the pixel region 66. The small case "m" represents the initial pixel characteristic 42 of the potentially misidentified ambient pixel 40 being considered for re-characterization the system's 16 gravity-based processing. The variable "r" represents the "radius" or the number of pixels between the pixel region 66 and the ambient pixel 40 being considered for re-classification as an occupant pixel 40.

Gravity-based processing and the gravity-based heuristic incorporates the assumption that ambient pixels 40 in the general vicinity of the pixel region 66 of occupant pixels 40 (a group of occupant pixels where each occupant pixel is adjacent to at least one other occupant pixel) may actually be misidentified occupant pixels 40. The system 16 can incorporate a heuristic resembling the manner in which physics measures the impact of gravity on an object. The size of the pixel region 66 and the distance between the pixel region 66 and the potentially misidentified ambient pixel 40 are two potentially important variables for gravity-based processing. The "gravity" of a particular pixel region 66 can be compared to a predetermined threshold to determine whether or not an occupant pixel 40 has been misidentified as an ambient pixel 40.

The gravity-based effects of each pixel region 66 can be checked for each pixel classified as an ambient pixel 40. In such an embodiment, the "gravitational" effects of multiple pixel regions 66 on a particular ambient pixel 40 can be considered. Alternatively, the "gravitational" effect for a particular pixel region 66 is calculated outward until the point in which ambient pixels 40 are no longer re-classified as occupant pixels 40, eliminating the need to perform calculations for each pixel 40 or even any additional ambient pixels 40.

I. Ellipse Fitting Subsystem

Figure 9:
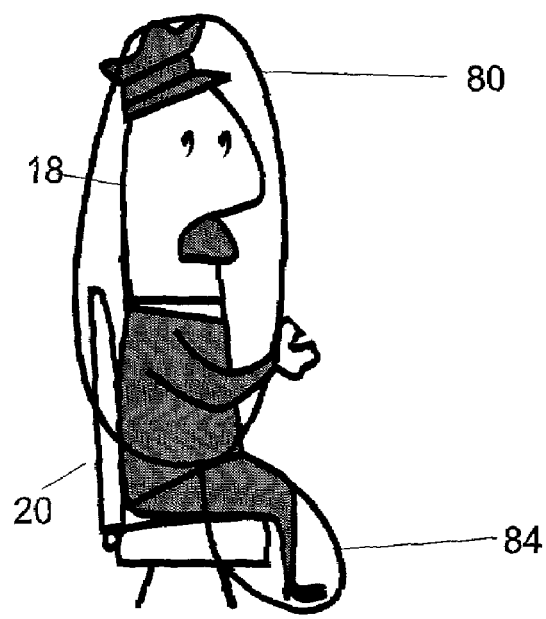
FIG. 9 is a diagram illustrating how an upper ellipse, a lower ellipse, and a centroid can be used to represent a segmented image of an occupant.

The system 16 can use an ellipse fitting subsystem to create an ellipse to represent the segmented image 31 of the occupant 18. In alternative embodiments, alternative shapes can be used to represent the segmented image 31 of the occupant 18. FIG. 9 illustrates one example of the type of results that can be generated by the ellipse fitting process. In a preferred embodiment, the ellipse fitting subsystem is software in the computer 30, but in alternative embodiments, the ellipse fitting subsystem can be housed in a different computer or device.

The upper ellipse 80 can extend from the hips up to the head of the occupant 18. The lower ellipse 84 can extend down from the hips to include the feet of the occupant 18. If the entire area from an occupant's 18 hips down to the occupant's 18 feet is not visible, a lower ellipse can be generated to represent what is visible. An ellipse 80 can be tracked by the system 16 using a single point on the ellipse 80, such as a the centroid of the ellipse 80, described in greater detail below. Many ellipse fitting routines are known in the art. A preferred embodiment does not utilize the lower ellipse 84.

Figure 10:
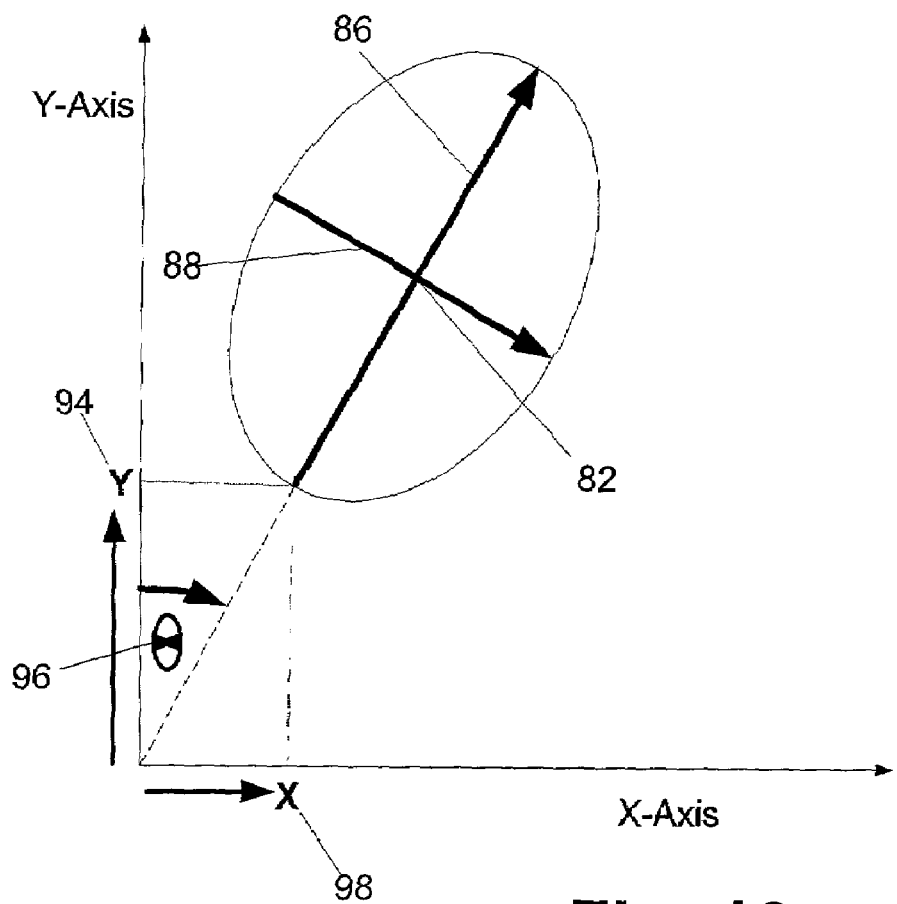
FIG. 10 is a diagram of an upper ellipse representing an occupant, and some of the important characteristics of the upper ellipse.

FIG. 10 illustrates many of the variables tat can be derived from the upper ellipse 80 to represent some characteristics of the segmented image 31 of the occupant 18 with respect to an airbag deployment system 36. A centroid 82 of the upper ellipse 80 can be identified by the system 16 for tracking characteristics of the occupant 18. It is known in the art how to identify the centroid 82 of an ellipse. Alternative embodiments could use other points on the upper ellipse 80 to track the characteristics of the occupant 18 that are relevant to airbag deployment 36 or other processing. A wide variety of occupant 18 characteristics can be derived from the upper ellipse 80.

Motion characteristics include the x-coordinate ("distance") 98 of the centroid 82 and a forward tilt angle ("θ") 96. Shape measurements include the y-coordinate ("height") 94 of the centroid 82, the length of the major axis of the ellipse ("major") 86 and the length of the minor axis of the ellipse ("minor") 88. Rate of change information, such as velocity and acceleration, can also be captured for all shape and motion characteristics.

J. Overall Segmentation Process

The various processes that can be performed by the system 16 can be implemented in many different ways, as discussed in greater detail above. The system 16 has a voluminous number of different potential embodiments. Some embodiments will not need to use all of the potential processes. Different embodiments can also use different parameters for carrying out a particular process or series of processes.

Figure 11:
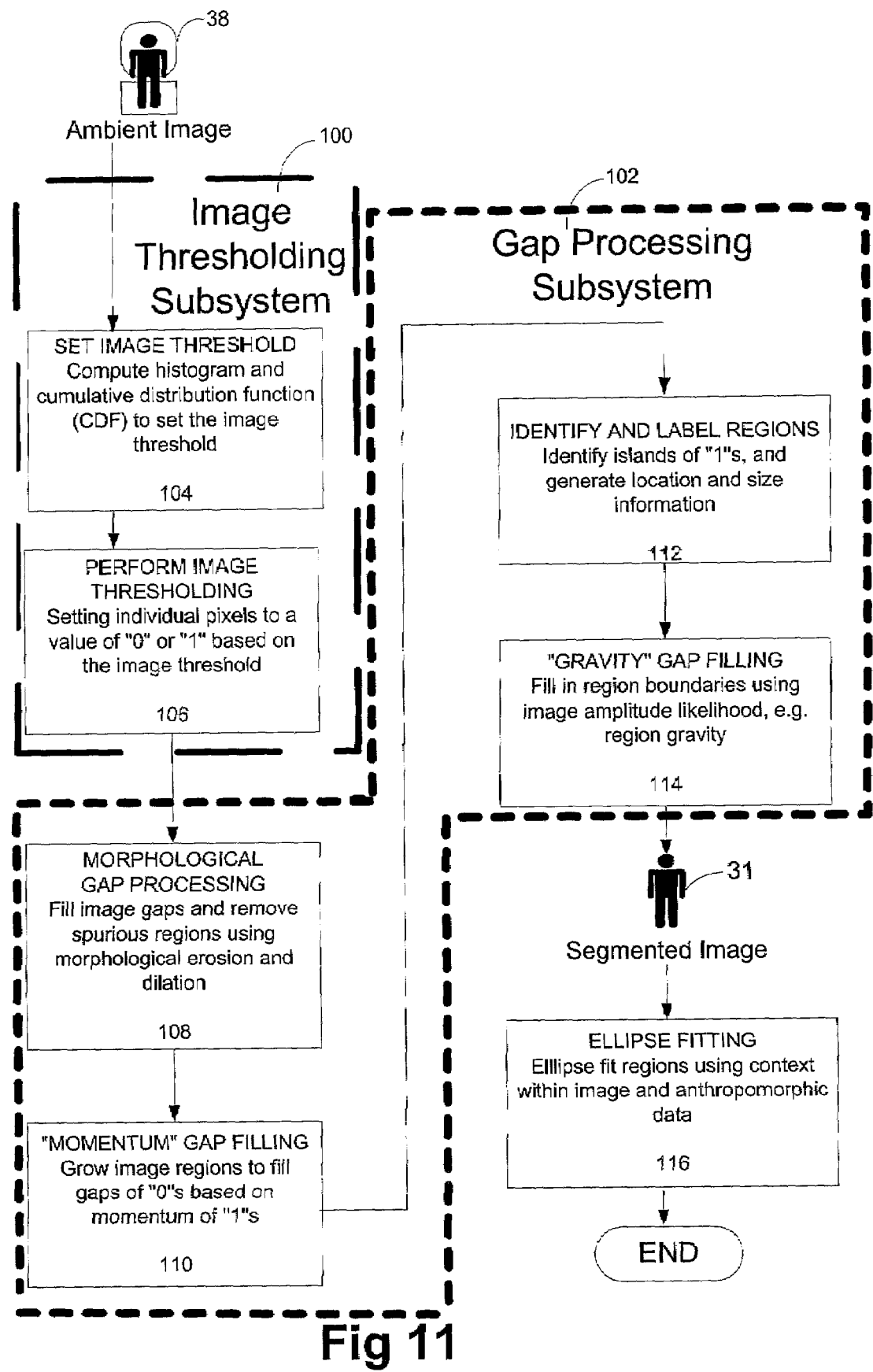
FIG. 11 is a flowchart of the image thresholding subsystem and the gap filling subsystem, including some of the various modules and processes that can be incorporated into those subsystems.

FIG. 11 discloses one example of a process flow for the system 16 to isolate the segmented image 31 of the occupant 18 from the ambient image 38 that includes both the occupant 18 and the surrounding seat area 21. The ambient image 38 of the occupant 18 and surrounding seat area 21 is an input of the computer system 30. As described above, the ambient image 38 includes a number of pixels 40. The system 16 receives the ambient image 38 in the form of pixels 40 that represent the ambient image 38. Each pixel 40 has one or more pixel characteristics 42, such as a luminosity, and each pixel characteristic can be associated with one or more pixel values for a particular pixel (for example, a particular pixel can have a luminosity value between 0 and 255). A segmentation process can be performed using a computer system 30 which houses an image thresholding subsystem 100 and a gap processing subsystem 102. An ellipse fitting subsystem 116 can be used to generate an upper ellipse 80 representing the segmented image 31 of the occupant 18, but the ellipse fitting process at 116 is not required for use of the system 16.

1. Image Thresholding Subsystem

The image thresholding subsystem 100 can include two different modules, a set image threshold module 104 and a perform image thresbolding module 106. The system 16 can generate an image threshold 44 to identify a first subset of pixels 40 as occupant pixels 40 and a second subset of pixels 40 as ambient pixels 40. The image threshold(s) 44 can be set by incorporating pixel characteristic 42 information as disclosed in FIGS. 3, 4, and 5 and discussed in greater detail above. The application of the image threshold 44 involves comparing the pixel value 45 of a pixel 40 to the image threshold 44 in order to categorize or identify pixels 40 as belonging to one of two or more pixel categories, and then setting the revised pixel value 56 for the particular pixel 40 in accordance with the revised pixel value 56 associated with the pixel category. In a preferred embodiment, pixels 40 categorized at the time as representing the segmented image 31 of the occupant are set to a value of "1" and can be referred to as occupant pixels. In a preferred embodiment, pixels 40 categorized at the time as representing aspects of the ambient image 38 not relating to the occupant 18 are set to a pixel value 56 of "0" and can be referred to as ambient pixels. In a preferred embodiment, each pixel 40 has only one pixel value 56, and that value is based on luminosity as the pixel characteristic 42.

a. Set Image Threshold Module

Generating an image threshold 44 can include the process of analyzing the distribution of pixel values 56 for one or more pixel characteristics 42 for some or all pixels 40. The set image threshold module 104 can use the histogram 39 in FIG. 3 to record the number of pixels 40 with a particular pixel value 56 for a pixel characteristic 42, such as for example a pixel 40 with a luminosity value of 255. The histogram 39 of FIG. 3 can be translated into the cumulative distribution curve 52 as disclosed in FIG. 5. The cumulative distribution curve 52 of FIG. 5 can be used to convert the desired N percentage into a image threshold 44 based in a numerical value Y relating to the pixel characteristic(s) and pixel value(s) captured in the ambient image 38. Thus, the histogram 39 and cumulative distribution curve 52 can be used to calculate the appropriate image threshold(s) 44 as disclosed in FIG. 4. The system 16 preferably uses more than one image threshold 44 to incorporate differences in lighting. Each image threshold 44 can be created to have a predetermined percentage of pixels 40 fall below the image threshold 44. The predetermined percentage for a particular image threshold 44 can take into account the relative locations of the pixels 40 with respect to the entire ambient image 38.

The histogram 39, cumulative distribution curve 52, and image threshold 44 are discussed in greater detail above.

b. Perform Image Tresholding Module

The perform image thresholding module sets individual pixel values 56 according to the relationship between the pixel characteristic 42 for a particular pixel 42, and the particular image threshold 44 applicable to that particular pixel 42 being set. The system 16 can modify pixel values 56 so that each pixel 40 in a particular pixel category shares the same pixel value 56.

In a preferred embodiment, pixels 40 categorized at the time as representing the segmented image 31 of the occupant are set to a first binary value of "1" and can be referred to as occupant pixels. In a preferred embodiment, all other pixels 40 are categorized as ambient pixels with a second binary value of "0."

2. Gap Processing Subsystem

After some or all of the pixel values 56 have been set in accordance to one or more image thresholds 44, a gap processing subsystem 102 can be used by the system 16 to modify pixel values 56 in a manner that incorporates intelligence in the form of other pixel values 56 in the vicinity of the particular pixel 40 having its pixel value 56 set by the system 16. The gap processing subsystem 102 applies a gap filling or gap processing heuristic to modify pixel values 56. The system 16 can change pixel values 56 on the basis of other pixel values 56 relating to the pixels 40 in the vicinity of the pixel value 56 being changed. A segmented image 31 of the occupant 18 can then be derived from the modified pixel values 56.

The gap processing subsystem 102 can incorporate a morphological processing module 108, a momentum-based processing module 110, an identify and label pixel regions module 112, and a gravity-based processing module 114.

a. Morphological Processing Module

A morphological processing module 108 can be used to both remove outlier occupant pixels 40 and to connect regions 66 of occupant pixels separated by outlier ambient pixel values 56 by changing certain occupant pixels 40 to ambient pixels 40 and by changing certain ambient pixels 40 into occupant pixels 40. The morphological processing module 108 is described in greater detail above, and the various morphological heuristics can be performed in any order.

In a preferred embodiment, vertical morphological erosion is performed first to remove spurious pixels 40 that are oriented horizontally, including such parts of the occupant 18 as the arms stretched out in a forward direction. A vertical morphological dilation can then be performed to "grow out" the occupant pixels 40 back to their appropriate "size" by transforming certain ambient pixels 40 into occupant pixels 40.

Horizontal morphological erosion can then be performed in a similar manner, followed by horizontal morphological dilation to once again "grow out" the occupant pixels 40.

Morphological processing is based on the useful assumption that the pixel value 56 of a particular pixel 40 is often related to the pixel values 56 for pixels 40 in the same vicinity as the particular pixel 40 being set. Morphological processing is one mechanism that can allow the system 16 to incorporate the knowledge of vicinity pixel values 56 to offset flaws in the camera 22 or flaws in the underlying intelligence applied by the system 16 in such mechanisms as the image threshold 44 and other processes or tools.

The vertical groups 58 and horizontal groups 60 used to perform morphological processing are illustrated in FIGS. 6a and 6b, and are described in greater detail above.

b. Momentum-based Processing Module

The momentum-based processing module 110 incorporates a momentum-based heuristic to set pixel values 56. This process is described in greater detail above. The momentum-based heuristic incorporates the intelligence that the existence of a string of sequential occupant pixels increases the likelihood that the next pixel in the sequence is also an occupant pixel 40, and should have the appropriate pixel value assigned to that pixel 40. A sufficient number of occupant pixels 40 can have the "momentum" to overcome a series of ambient pixels, resulting in those ambient pixels 40 being re-classified as occupant pixels 40 by the momentum-based heuristic.

As discussed in greater detail above, the momentum-based heuristic uses a counter to calculate the momentum effects of a series of pixel values 56. The counter determines whether or not sufficient "momentum" exists to re-classify a sequence of ambient pixels 40 as occupant pixels 40. They system 16 can be flexible in the different positive and negative weights associated with a particular pixel value 56. A first predetermined number can be added to the counter value each time the next adjacent pixel 40 belongs to a first pixel category, such as an occupant pixel 40, and a second predetermined number can be subtracted from the counter value each time the next adjacent pixel 40 belongs to a second pixel category, such as an ambient pixel 40. If the counter reaches a value less than or equal to zero before a sequence of ambient pixels 40 is traversed by occupant pixel 40 "momentum" ten the remaining sequence of ambient pixels 40 remain as ambient pixels 40. Some embodiments can implement a linear approach to momentum-based processing, applying momentum on a pixel by pixel basis. Other embodiments may implement a threshold approach, where if the entire sequence of ambient pixels 40 is not overcome by occupant pixel 40 momentum, then none of the ambient pixels 40 in the sequence are re-classified as occupant pixels 40.

c. Identify and Label Pixel Regions Module

The system 16 can identify pixel regions 66 (groups of occupant pixels 40 where each occupant pixel 40 is adjacent to at least one other occupant pixel 40). Such processing can be performed by an identify and label pixel regions module 112. Pixel regions 66 can be associated with a unique label, and can possess certain region attributes or characteristics such as size, location, and distance to other regions 66 and pixels 40. FIG. 8 is an example of an ambient image 38 containing four pixel regions 66. Pixel regions 66 can be used by the gravity-based processing module 114, and can in alternative embodiments, also be used by the momentum-based processing module 110.

d. Gravity-based Processing Module

A gravity-based processing module 114 allows the system 16 to incorporate the logical and useful assumption that ambient pixels 40 adjacent or close to a region 66 of occupant pixels 40 may simply be mis-categorized occupant pixels 40. The gravity-based heuristic is described in greater detail above. The heuristic can incorporate the "mass" of the initial luminosity values 42 associated with occupant pixels 40 as well as ambient pixels 40 being considered for re-classification as occupant pixels 40 due to the "gravity" and relatively close distance between the pixel region 66 of occupant pixels 40 and the ambient pixel 40 considered for re-classification.

3. Segmented Imaged

The segmented image 31 of the occupant 18 in isolation of the non-occupant images surrounding the occupant 18 in the ambient image 38 can be outputted from the gap processing subsystem 102. For the purposes of airbag deployment, the ellipse fitting subsystem 116 can generate an upper ellipse 80 from the occupant pixels and ambient pixels 40 outputted from the gap processing subsystem 102. For other embodiments, if other visual characteristics of the occupant are desirable, the initial pixel characteristics 42, such as luminosity in the preferred embodiment, can replaced the pixel values 56 for all occupant pixels 40, resulting in a segmented image 31 of the occupant 18. In some embodiments, the binary outline of the segmented image 31 of the occupant 18 is all that is required for the ellipse fitting subsystem. In other embodiments, a more visually detailed segmented image 31 can be generated by simply plugging back the initial luminosity values for each of the segmented pixels 40.

4. Ellipse Fitting Subsystem

As discussed in greater detail above, an ellipse fitting subsystem 116 can be used to generate an ellipse 80 representing the segmented image 31 of the occupant 18. The upper ellipse 80 and characteristics relating to the upper ellipse 80 can provide the airbag controller 32 with useful information relating to the occupant 18 in order to provide the appropriate deployment instructions to the airbag deployment system 36.

The system 16 can also be incorporated in any other system 16 utilizing an occupant 18 image, including but not limited to trains, planes, motorcycles, or any other type of vehicle or structure in which an occupant 18 sits in a seat 20. The system 16 also has utility not limited to the field of occupant 18 images.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

What is claimed is:

1. An image segmentation meted for use with an occupant, a sensor for generating sensor measurements, and an ambient image including an occupant and the area surrounding the occupant, said image segmentation method comprising the following steps:

receiving an ambient image represented by a plurality of pixels and a plurality of initial pixel values, wherein each said pixel has at least one said initial pixel value;

identifying one or more pixels as belonging to one of a plurality of pixel categories on the basis of one or more initial pixel values associated with the pixels being identified, wherein identifying one or more said pixels further includes generating an image threshold;

establishing a first revised pixel value for one or more pixels, wherein each pixel in the same pixel category has the same first revised pixel value;

setting a second revised pixel value for one or more of said pixels on the basis of one or more first revised pixel values that are associated with one or more pixels in the vicinity of the pixel being set, wherein setting the second revised pixel value includes a momentum-based heuristic; and deriving a segmented image of the occupant from said first revised pixel value and said second revised pixel value.

2. An image segmentation method as in claim 1, wherein identifying one or more said pixels further includes comparing said plurality of initial pixel values to said image threshold.

3. An image segmentation method as in claim 1, wherein generating an image threshold further comprises analyzing the distribution of initial pixel values relating to a pixel characteristic.

4. An image segmentation method as in claim 3, wherein analyzing the distribution of initial pixel values further includes:

recording aggregate initial pixel values into a histogram;

translating the histogram into a cumulative distribution function; and calculating an image threshold based on a predetermined percentage of initial pixel values falling below the image threshold.

5. An image segmentation method as in claim 3, wherein each pixel has only one initial pixel value and only one pixel characteristic.

6. An image segmentation method as in claim 5, wherein luminosity is said pixel characteristic.

7. An image segmentation method as in claim 2, wherein each said pixel has a pixel location with respect to the ambient image, and said pixel location determines which of a plurality of image thresholds are compared to said initial pixel value for said pixel in said pixel location.

8. An image segmentation method as in claim 7, wherein a higher image threshold is applied in pixel locations where there is brighter lighting.

9. An image segmentation method as in claim 1, wherein there are only two pixel categories.

10. An image segmentation method as in claim 1, wherein setting the second revised pixel value includes a morphological heuristic.

11. An image segmentation method as in claim 10, wherein the morphological heuristic is a morphological erosion.

12. An image segmentation method as in claim 11, wherein the morphological heuristic is a morphological dilation.

13. An image segmentation method as in claim 1, wherein a subset of said plurality of pixels are a group of adjacent pixels, wherein said plurality of pixel categories includes a first pixel category and a second pixel category, and wherein setting the second pixel value further comprises:

analyzing in a sequential manner the subset of pixels in the group of adjacent pixels;

adding to a counter value each time the next pixel in the sequence belongs to said first pixel category; and subtracting from said counter value each time the next pixel in the sequence belongs to said second pixel category.

14. An image segmentation method as in claim 13, wherein the momentum-based heuristic stops when the counter value is less than or equal to zero.

15. An image segmentation method for use with an occupant, a sensor for generating sensor measurements, and an ambient image of an occupant and the area surrounding the occupant said image segmentation method comprising the following steps:

receiving an ambient image represented by a plurality of pixels and a plurality of pixel values, wherein each of said pixels has at least one said initial pixel value;

recording aggregate initial pixel values in a histogram;

translating the histogram into a cumulative distribution function;

calculating an image threshold using the cumulative distribution function with a predetermined percentage of initial pixel values falling below the image threshold;

categorizing each pixel in the plurality of pixels into one of a plurality of pixel categories by comparing the image threshold to the initial pixel value for the pixel being categorized;

establishing a first revised pixel value so that each pixel in the same pixel category shares the same first revised pixel value;

modifying said first revised pixel value into a second revised pixel value in accordance with morphological heuristic;

determining a third revised pixel value from said second revised pixel value or said first revised pixel value with a momentum-based heuristic;

identifying regions of pixels based on the first revised pixel value, the second revised pixel value, and the third revised pixel value;

generating a fourth revised pixel value from the regions of pixels in accordance with a gravity-based heuristic; and deriving a segmented image of the occupant with the fourth revised pixel value.

16. An image segmentation method for use with an occupant as in claim 15, wherein deriving a segmented image of the occupant includes substituting the initial pixel value for said fourth revised pixel value representing the occupant image.

17. An image segmentation system for use with an occupant, a sensor for generating sensor measurements, and an ambient image of an occupant and the area around the occupant, said image segmentation system comprising:

an image thresholding subsystem, including a plurality of pixels representing the ambient image, and an image thresholding heuristic, said image thresholding subsystem categorizing said plurality of pixels in accordance with said image thresholding heuristic; and a gap processing subsystem, including a gap processing heuristic, a subset of vicinity pixels in said plurality of pixels, and a plurality of pixel values, said gap processing subsystem selectively setting said pixel values in accordance with said gap processing heuristic and said pixel values belonging to said pixels in said subset of vicinity pixels, said gap processing heuristic including a momentum-based heuristic; and wherein a segmented image is generated from said plurality of pixels.

18. An image segmentation system as in claim 17, said image thresbolding subsystem comprising a plurality of luminosity values, wherein each said pixel has at least one said luminosity value.

19. An image segmentation system as in claim 18, said image thresholding subsystem further comprising a histogram, wherein said histogram tabulates the number of said pixels having said luminosity value.

20. An image segmentation system as in claim 19, said image thresholding subsystem further comprising a cumulative distribution curve, wherein said histogram is converted into said cumulative distribution curve by said image thresholding subsystem.

21. An image segmentation system as in claim 20, said image thresholding subsystem further comprising a predetermined percentage and an image threshold, wherein said image threshold is calculated from said predetermined percentage and said cumulative distribution curve.

22. An image segmentation system as in claim 21, said image thresholding subsystem comprising a plurality of image thresholds and said pixel includes a pixel location, wherein said pixel location for said pixel determines which said image threshold is used for said pixel by said image thresholding subsystem.

23. An image segmentation system as in claim 21, said image thresholding subsystem further including a first subset of said plurality of pixels and a second subset of said plurality of pixels, said image thresholding subsystem dividing said plurality of pixels into said first subset of pixels and said second subset of pixels wit said image threshold.

24. An image segmentation system as in claim 23, said image thresholding subsystem further including a first binary value and a second binary value, wherein said first subset of said plurality of pixels is set to said first binary value and said second subset of said plurality of pixels is set to said second binary value.

25. An image segmentation system as in claim 24 wherein at least approximately half of said plurality of said pixels arc set to said first binary value.

26. An image segmentation system as in claim 17, said gap processing heuristic including a morphological heuristic.

27. An image segmentation system as in claim 26, said morphological heuristic comprising a morphological erosion.

28. An image segmentation system as in claim 26, said morphological heuristic comprising a morphological dilation.

29. An image segmentation system as in claim 26, said morphological heuristic comprising a vertically-based morphological heuristic.

30. An image segmentation system as in claim 26, said morphological heuristic comprising a horizontally-based morphological heuristic.

31. An image segmentation system as in claim 17, said subset of vicinity pixels comprising a subset of sequential pixels, arid said gap processing subsystem selectively setting said pixel value using said momentum-based heuristic and said pixel values relating to said subset of sequential pixels.

32. An image segmentation system as in claim 31, said sequential subset of pixels including a sequential vertical subset of pixels and a sequential horizontal subset of pixels, wherein said momentum-based heuristic analyzes said pixel values in said sequential vertical subset of pixels and said sequential horizontal subset of pixels, to determine said plurality of pixel values.

33. An image segmentation system as in claim 32, said momentum-based heuristic further comprising a momentum counter, said momentum counter determining when said gap processing subsystem terminates said momentum-based heuristic for said pixel value.

34. An image segmentation system as in claim 24
said gap processing heuristic comprising a gravity-based heuristic, a pixel region and a region characteristic;
said plurality of pixels including a target pixel;
wherein said pixel region includes one or more said pixels;
wherein said pixel region does not include said target pixel; and
wherein said pixel region is a subset of said vicinity pixels.

35. An image segmentation system as in claim 34
said gravity-based heuristic further including a region size and a region distance;
wherein said region size is the number of said pixels in said pixel region;
wherein said region distance is the distance between said target pixel and a center point in said pixel region; and
wherein said gap processing subsystem sets said target pixel in accordance with said region size, said region distance, and said gravity-based heuristic.

36. An image segmentation method as in claim 7, wherein said plurality of image Thresholds includes a first image threshold and a second image threshold, said second image threshold being lower than said first image threshold, and wherein said first image threshold is associated with an upper area of the ambient image and said second image threshold is associated with a middle area of the ambient image.

37. An image segmentation method as in claim 36, wherein said plurality of image thresholds includes a third image threshold, said third image threshold being lower than said second image threshold, and wherein said third image threshold is associated with a bottom area of the ambient image.

38. An image segmentation system as in claim 22, wherein said plurality of image thresholds includes a first image threshold and a second image threshold, said second image threshold being lower than said first image threshold, and wherein said first image threshold is associated wit an upper area of the ambient image and said second image threshold is associated with a middle area of the ambient image.

39. An image segmentation system as in claim 38, wherein said plurality of image thresholds includes a third image threshold, said third image threshold being lower than said second image Threshold, and wherein said third image threshold is associated with a bottom area of the ambient image.

40. An image segmentation method as in claim 1, wherein setting the second revised pixel value includes a gravity-based heuristic.

41. An image segmentation method as in claim 1, wherein the one or more pixels the vicinity of the pixel being set includes a subset of sequential pixels, said step of setting the second revised pixel value including using the momentum-based heuristic to determine the second revised pixel value based on the first revised pixel values associated with the subset of sequential pixels.

42. An image segmentation method as in claim 41, wherein the subset of sequential pixels is either horizontally sequential or vertically sequential.

43. An image segmentation method as in claim 41, said step of setting the second revised pixel value including:

- sequentially traversing the subset of sequential pixels to identify the first revised values associated with the subset of sequential pixels;
- incrementing or decrementing a counter value based on the first revised value associated with each of the sequential pixels; and
- determining the second revised pixel value based on the counter value.

\* \* \* \* \*

UNITED STATES PATENT AND TRADEMARK OFFICE
CERTIFICATE OF CORRECTION

PATENT NO.        : 7,116,800 B2
APPLICATION NO.   : 10/023787
DATED             : October 3, 2006
INVENTOR(S)       : Michael E. Farmer It is certified that error appears in the above-identified patent and that said Letters Patent is hereby corrected as shown below:

Col. 17, line 8, "meted" should be --method--.

Col. 17, line 26, insert --sequential-- before "pixels".

Col. 18, line 25, insert --,-- after "the occupant".

Col. 19, line 4, insert --sequential-- before "vicinity".

Col. 19, line 9, insert --sequential-- before "vicinity".

Col. 19, line 14, "thresbolding" should be --thresholding--.

Col. 19, line 42, "wit" should be --with--.

Col. 19, line 50, "arc" should be --are--.

Col. 20, line 3, "arid" should be --and--.

Col. 20, line 19, insert --:-- after "24".

Col. 20, line 40, "Threshold" should be --threshold--.

Col. 20, line 65, "Threshold" should be --threshold--.

Signed and Sealed this

Sixth Day of February, 2007

JON W. DUDAS
*Director of the United States Patent and Trademark Office*